Jan. 8, 1929.
D. S. STEVENS
1,698,075
ROLLER BEARING CAGE
Filed March 9, 1925
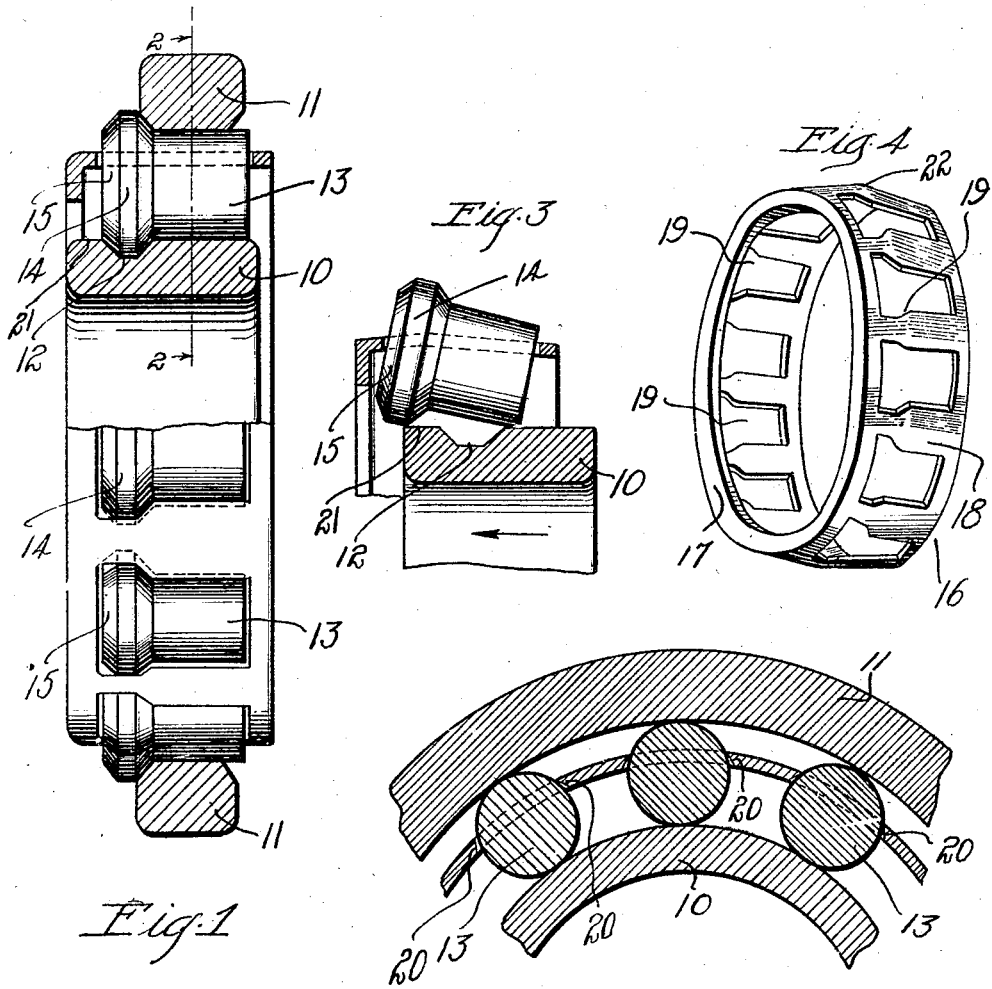
Inventor
Daniel S. Stevens
By Whittemore Hulbert Whittemore
Belknap
Attorneys Patented Jan. 8, 1929.

1,698,075

UNITED STATES PATENT OFFICE.

DANIEL S. STEVENS, OF DETROIT, MICHIGAN, ASSIGNOR TO BOWER ROLLER BEARING COMPANY, OF DETROIT, MICHIGAN, A CORPORATION OF MICHIGAN.

ROLLER-BEARING CAGE.

Application filed March 9, 1925. Serial No. 14,257.

This invention relates to roller bearing cages and to a method of assembling roller bearings.

The invention has as one of its objects to produce a roller bearing cage, of integral construction but designed to facilitate the assembling of the cage, and the shouldered rollers supported thereby with the inner bearing piece or the like, of a roller bearing. The invention has also as an object to simplify, render more efficient, and improve generally, constructions of this general type, as well as to simplify the method of assembling involved.

An illustrative embodiment of this invention together with the method involved, will be described and illustrated in detail in the accompanying specification and drawings, wherein—

Figure 1 is a view, partly in a longitudinal section, of a roller bearing provided with a cage construction in accordance with this invention;

Figure 2 is a fragmentary sectional view taken substantially on the plane indicated on the line 2—2 of Figure 1;

Figure 3 is a fragmentary longitudinal sectional view showing the method of assembling; and Figure 4 is a perspective view of the cage prior to assembling.

Referring now particularly to the drawings wherein like reference characters indicate like parts, it will be noted that in Figure 1 inner and outer bearing pieces 10 and 11 are illustrated, the inner bearing piece being herein shown as provided with a circumferential groove 12. A plurality of rollers 13 with annular shoulders 14 are arranged to travel between the inner and outer bearing pieces 10 and 11, the shouldered portion of each roller being herein shown as provided with inclined surfaces 15 adapted to engage corresponding surfaces in the groove 12 for taking care of end thrusts in either direction.

The reference character 16 indicates generally the roller bearing cage. This cage is herein shown as comprising an integral structure formed with an inwardly extending peripheral flange 17 at one edge thereof. The body 18 of the cage is provided with a plurality of roller receiving openings or apertures 19, herein shown as substantially T-shaped, in plan view to accommodate the headed rollers 13. The cage 16 is adapted to embrace the rollers 13 in a circumferential plane slightly past the plane of the centres of the rollers. The sides of the openings 19 are inclined as shown at 20 to conform to the curvature of the rollers whereby the cage may be caused to closely but loosely embrace the rollers and prevent a displacement of the rollers radially outward when the outer bearing piece 11 is removed.

In assembling the roller bearing engagement is first effected between the rollers and the cage supporting the rollers. As shown in Figure 3 the inner bearing piece 10 is then moved in the direction of the arrow with reference to the cage and when the peripheral edge of the inner bearing piece indicated by the reference character 21 contacts with the shouldered portions 14 of the rollers, allowances must be made to permit of an angular radial displacement of the several rollers to afford a clearance between the shoulders of the rollers and the peripheral portion 21 of the inner bearing member, sufficient to enable a further relative movement of the inner bearing member to position the groove 12 under the shoulders of the several rollers. When the inner bearing piece 10 has been properly positioned with reference to the cage and rollers the shouldered portions 14 of the rollers will seat themselves in the groove as shown in Figure 1.

For the purpose of permitting this angularly radial displacement of the rollers the cage is expanded or bowed outwardly circumferentially at a predetermined line transversely of the cage at the point indicated by the reference character 22, and this circumferential point is herein shown as substantially adjacent the enlarged ends of the roller receiving openings 19.

Consequently during the assembling of the bearing as suggested in Figure 3 the rollers 13 are permitted to move radially outward and assume the angular position illustrated whereby the heads or shouldered portions 14 of the rollers may pass over the peripheral portion 21 of the inner bearing piece so that the assembling may be completed. As mentioned hereinbefore the rollers thereupon seat themselves with the shouldered portions 14 thereof resting in the circumferential groove 12.

After an assembly in the manner above described the cage 16 is shaped into its normal or permanent form by eliminating the circumferential bow therefrom. As shown in Figure 1 the cage after being thus shaped, embraces the rollers slightly beyond the centers thereof and together with the inner bearing piece, hold the rollers properly spaced and fixed with relation to the bearing pieces of the completed bearing.

A roller bearing cage constructed in accordance with this invention may be economically and easily manufactured as it may be stamped from a single sheet of material. While the cage herein illustrated is substantially truly cylindrical it is obvious that the shape of the cage may be varied in accordance with the type of roller employed, without departing from the spirit and scope of this invention.

It also will be obvious that the method of assembling may be expressed as including the step of radially deforming the cage or may be described as employing a cage already deformed. Consequently it will be apparent to those skilled in this art that various modifications of this invention herein described may be resorted to without departing from the spirit and scope of this invention and to this end reservation is made to make such changes as may come within the purview of the accompanying claims.

What I claim as my invention is:

1. In the method of assembling roller bearings having a cage supporting shouldered rollers, the steps consisting of placing the rollers in a cage deformed to permit radial movement of the rollers, inserting the inner bearing piece within the cage while the rollers are permitted radial displacement sufficient to afford clearance between the shoulders and the inner bearing piece, and then shaping the cage to prevent radial displacement of the rollers.

2. In the method of assembling roller bearings having a cage supporting shouldered rollers, the steps consisting of placing shouldered rollers in a distorted cage, inserting the inner bearing piece within the cage while the rollers are radially angularly displaced sufficient to permit a clearance of the shoulders and the inner bearing piece, and then shaping said cage to hold said rollers in proper operative position.

3. In the method of assembling roller bearings having a cage supporting shouldered rollers, the steps consisting of placing shouldered rollers in a distorted cage, inserting the inner bearing piece within the cage while the rollers are displaced sufficiently to permit a clearance of the shoulders and the inner bearing piece, and then shaping said cage to hold said rollers in proper axial alignment.

4. In the method of assembling roller bearings having an integral cage supporting shouldered rollers, the steps consisting of placing the rollers in a circumferentially distorted cage, inserting the inner bearing piece within the cage while the rollers are permitted a radial angular displacement defined by the circumferential distortion of the cage, and then shaping said cage to hold said rollers in operative position.

5. In the method of assembling roller bearings having an integral cage supporting shouldered rollers, the steps consisting of placing shouldered rollers in a circumferentially distorted cage, inserting the inner bearing piece within the cage while the rollers are permitted a radial angular displacement defined by the circumferential distortion of the cage sufficient to afford a clearance between the shoulders and the inner bearing piece, and then shaping the cage to permanently hold the rollers in proper operating position.

6. In the method of assembling roller bearings having a cage supporting shouldered rollers, the steps consisting of placing the rollers within the cage, inserting the inner bearing piece within the cage carrying the rollers, the cage being distorted to permit displacement of the rollers sufficient to effect the insertion, and then shaping the cage into normal permanent form.

7. In the method of assembling roller bearings having a cage supporting shouldered rollers, the steps consisting of forming a cage with a circumferential distortion permitting radial displacement of the rollers during assembly of the bearing, assembling the rollers and an inner bearing piece within the cage, and then shaping said cage into normal form.

8. In the method of assembling roller bearings having a cage supporting shouldered rollers, the steps consisting of distorting a cage radially along a definite circumferential line, placing rollers and an inner bearing piece within the cage and after assembly restoring the cage to undistorted condition.

9. In the method of assembling roller bearings having a cage supporting shouldered rollers, the steps which consist of expanding a cage to permit the necessary angular displacement of the rollers during assembly, assembling rollers and a bearing piece within the cage and then shaping said cage into its permanent shape.

10. In the method of assembling roller bearings having cages supporting shouldered rollers, the steps consisting of radially expanding a cage to permit displacement of the rollers sufficient to effect assembly of the bearing, assembling the rollers within the cage and then contracting said cage to its permanent shape.

11. A roller bearing cage comprising an integral structure having a body portion provided with openings shaped to receive a plurality of shouldered rollers and circumferentially bowed to permit of an axial inclination of the rollers during the assembly of the bearing, said cage being adapted to be permanently shaped after assembly to prevent axial inclination of said rollers.

12. An integral roller bearing cage formed of a single piece of metal and comprising a body portion formed with a plurality of openings shaped to receive and support a plurality of shouldered rollers, said body being formed with an outwardly extending circumferential deformation, properly transversely arranged to permit of radial outward displacement of the shouldered portions of said rollers, said cage being adapted after assembly to be shaped to maintain said rollers against outward radial displacement.

13. An integral cage for a roller bearing comprising, a body formed with a plurality of openings adapted to support shouldered rollers, and capable of circumferential distortion to permit of radial displacement of the rollers during assembly of the bearing, and of reshaping for properly supporting said rollers.

In testimony whereof I affix my signature.

DANIEL S. STEVENS.